US012669855B2

(12) United States Patent
Nemani et al.

(10) Patent No.: US 12,669,855 B2
(45) Date of Patent: Jun. 30, 2026

(54) PERFORMING THERMAL MANAGEMENT BASED ON TEMPERATURE EVOLUTION MODELS IN PROCESSOR DEVICES

(71) Applicant: QUALCOMM Incorporated, San Diego, CA (US)

(72) Inventors: Mahadevamurty Nemani, San Diego, CA (US); Vadim Gektin, San Jose, CA (US); Anubhav Mishra, Fremont, CA (US); Pradeep Kanapathipillai, Campbell, CA (US); Nitin Makhija, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 18/407,690

(22) Filed: Jan. 9, 2024

(65) Prior Publication Data

US 2025/0224787 A1 Jul. 10, 2025

(51) Int. Cl.
*G06F 1/32* (2019.01)
*G06F 1/20* (2006.01)
*G06F 1/324* (2019.01)

(52) U.S. Cl.
CPC .............. *G06F 1/206* (2013.01); *G06F 1/324* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,323,870 | B2 * | 4/2016 | Chandra ................. | G06F 30/23 |
| 2007/0067136 | A1 * | 3/2007 | Conroy ................... | G06F 1/206 |
| | | | | 713/300 |

(Continued)

FOREIGN PATENT DOCUMENTS

WO 2018121937 A1 7/2018

OTHER PUBLICATIONS

International Search Report and Written Opinion for International Patent Application No. PCT/US2025/010395, mailed Apr. 4, 2025, 15 pages.

*Primary Examiner* — Zahid Choudhury
(74) *Attorney, Agent, or Firm* — W&T

(57) ABSTRACT

Performing thermal management based on temperature evolution models in processor devices is disclosed herein. In some aspects, a processor device provides a cluster thermal management circuit that is configured to determine power consumption measurements for corresponding functional units of a processor core of a plurality of processor cores of a core cluster. The cluster thermal management circuit also determines temperature measurements by corresponding digital thermal sensors (thermal sensor) external to a point of interest (POI) within the processor core. The cluster thermal management circuit generates a predicted temperature at the POI based on a temperature evolution model that correlates power consumption measurements and temperature measurements with the predicted temperature at the POI. If the cluster thermal management circuit determines the predicted temperature at the POI exceeds a thermal mitigation threshold, the cluster thermal management circuit performs a thermal management operation.

21 Claims, 7 Drawing Sheets

(56)　　　　　　References Cited

U.S. PATENT DOCUMENTS

| | | | |
|---|---|---|---|
| 2012/0271480 A1* | 10/2012 | Anderson | G06F 1/3206 |
| | | | 700/299 |
| 2014/0285964 A1* | 9/2014 | Atkinson | G06F 1/203 |
| | | | 361/679.46 |
| 2016/0124443 A1* | 5/2016 | Reda | G06F 1/203 |
| | | | 700/282 |
| 2017/0344100 A1* | 11/2017 | Shi | G06F 1/206 |
| 2020/0326994 A1* | 10/2020 | Ruiz | G06F 11/3058 |
| 2022/0136909 A1 | 5/2022 | Kim et al. | |
| 2022/0374568 A1 | 11/2022 | Baumann | |
| 2023/0205539 A1* | 6/2023 | Blagodurov | G06F 12/0862 |
| | | | 712/239 |
| 2024/0160260 A1* | 5/2024 | Ock | G06N 3/08 |
| 2024/0260230 A1* | 8/2024 | Bucci | G06F 1/20 |
| 2024/0402772 A1* | 12/2024 | Nandanwar | G06F 1/3206 |

* cited by examiner

┌─ 300

┌─ 302

RECEIVE, BY A CLUSTER THERMAL MANAGEMENT CIRCUIT (132) OF A CORE CLUSTER (102(0)) OF A PROCESSOR DEVICE (100), ONE OR MORE POWER CONSUMPTION MEASUREMENTS (206) FOR A CORRESPONDING ONE OR MORE FUNCTIONAL UNITS (126(0)-126(F)) OF A PROCESSOR CORE (104(0)) OF A PLURALITY OF PROCESSOR CORES (104(0)-104(C)) OF THE CORE CLUSTER (102(0))

┌─ 304

RECEIVE, BY THE CLUSTER THERMAL MANAGEMENT CIRCUIT (132), ONE OR MORE TEMPERATURE MEASUREMENTS (208(0)-208(1)) BY A CORRESPONDING ONE OR MORE THERMAL SENSORS (130(0)-130(1)) EXTERNAL TO A POINT OF INTEREST (POI) (128) WITHIN THE PROCESSOR CORE (104(0))

┌─ 306

GENERATE, BY THE CLUSTER THERMAL MANAGEMENT CIRCUIT (132), A PREDICTED TEMPERATURE (210) AT THE POI (128) BASED ON A TEMPERATURE EVOLUTION MODEL (134) THAT CORRELATES THE ONE OR MORE POWER CONSUMPTION MEASUREMENTS (206) AND THE ONE OR MORE TEMPERATURE MEASUREMENTS (208(0)-208(1)) WITH THE PREDICTED TEMPERATURE (210) AT THE POI (128)

┌─ 308

GENERATE, USING THE TEMPERATURE EVOLUTION MODEL (134), A FIRST MODEL (214) REPRESENTING A TEMPERATURE AT A THERMAL SENSOR OF THE ONE OR MORE THERMAL SENSORS (130(0)-130(1))

┌─ 310

GENERATE, USING THE TEMPERATURE EVOLUTION MODEL (134) AND THE FIRST MODEL (214), A SECOND MODEL (216) REPRESENTING A TEMPERATURE AT THE POI (128)

┌─ 312

GENERATE, USING THE TEMPERATURE EVOLUTION MODEL (134), A THIRD MODEL (218) REPRESENTING A BOUNDARY CONDITION

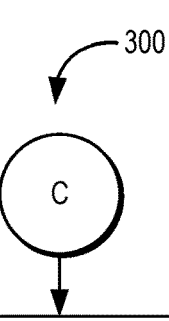

C

324

RESPONSIVE TO DETERMINING THAT THE PREDICTED TEMPERATURE (210) AT THE POI (128) EXCEEDS THE THERMAL MITIGATION THRESHOLD (212), PERFORMING, BY THE CLUSTER THERMAL MANAGEMENT CIRCUIT (132), A THERMAL MANAGEMENT OPERATION

326

CALCULATING A POWER THRESHOLD (220) FOR THE PROCESSOR CORE (104(0)) USING THE TEMPERATURE EVOLUTION MODEL (134), WHEREIN THE POWER THRESHOLD (220) REPRESENTS A MAXIMUM POWER THAT CAN BE CONSUMED BY THE PROCESSOR CORE (104(0)) WITHOUT EXCEEDING THE THERMAL MITIGATION THRESHOLD (212)

328

DETERMINE WHETHER A CURRENT POWER CONSUMPTION (222) OF THE PROCESSOR CORE (104(0)) EXCEEDS THE POWER THRESHOLD (220)

330

RESPONSIVE TO DETERMINING THAT THE CURRENT POWER CONSUMPTION (222) BY THE PROCESSOR CORE (104(0)) EXCEEDS THE POWER THRESHOLD (220):

332

IDENTIFY A TARGET CLOCK THROTTLING LEVEL (224) THAT IS LOWER THAN A CURRENT CLOCK THROTTLING LEVEL (226) OF THE CORE CLUSTER (102(0))

334

TRANSMIT THE TARGET CLOCK THROTTLING LEVEL (224) TO A CLOCK THROTTLING CIRCUIT (124)

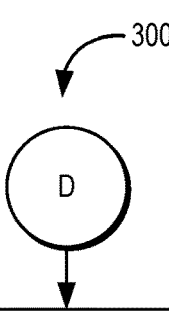

D

---

324

RESPONSIVE TO DETERMINING THAT THE PREDICTED TEMPERATURE (210) AT THE POI (128) EXCEEDS THE THERMAL MITIGATION THRESHOLD (212), PERFORMING, BY THE CLUSTER THERMAL MANAGEMENT CIRCUIT (132), A THERMAL MANAGEMENT OPERATION (CONTINUED)

336

SELECT A TARGET OPERATING POINT (236) FROM AMONG THE ONE OR MORE OPERATING POINTS (228), WHEREIN THE TARGET OPERATING POINT (236) IS LOWER THAN A CURRENT OPERATING POINT (238) FOR THE CORE CLUSTER (102(0))

338

BASED ON THE FREQUENCY CHANGE POLICY (234)

340

TRANSMIT THE TARGET OPERATING POINT (236) TO A DYNAMIC VOLTAGE AND FREQUENCY SCALING (DVFS) CIRCUIT (122)

FIG. 3D

PERFORMING THERMAL MANAGEMENT BASED ON TEMPERATURE EVOLUTION MODELS IN PROCESSOR DEVICES

BACKGROUND

I. Field of the Disclosure

The technology of the disclosure relates generally to thermal management in multicore processor devices, and, in particular, to thermal management for clusters of processor cores of a processor device.

II. Background

Conventional processor devices may be implemented as multiple processing units, or "processor cores," that are organized into core clusters, with each processor core configured to fetch, decode, and execute computer instructions to manipulate and store data. Because a multicore processor device can execute instructions on multiple processor cores simultaneously, the performance of software that supports parallel computing techniques such as multithreading may be improved. Each core cluster of a multicore processor device may be "synchronous," in that all processor cores of the core cluster are clocked using a single clock source such as a phase-locked loop (PLL). Because the processor cores all share the same clock source, a change in frequency for a synchronous core cluster affects all of the active processor cores within the core cluster. The processor cores in the core cluster also may be implemented using a shared Level 2 (L2) microarchitecture in which the processor cores are connected to, and share, a single L2 cache.

Many conventional processor cores include functional units (e.g., integer execution units (IXUs), vector execution units (VXUs) and arithmetic logic units (ALUs), as non-limiting examples) that account for a larger proportion of power consumption relative to other elements of the processor device, and thus tend to exhibit higher power densities relative to those other elements. Depending on the type of workload being executed by a processor core, power consumption by the processor core at a given time may be concentrated within specific functional units of the processor core. These points of higher power consumption result in localized "hot spots," where the temperature is higher than other regions within the processor core. For example, an IXU of the processor core consumes more power, and thus generates more heat, than other regions within the processor core when the processor core executes a workload consisting of primarily integer operations. Likewise, a vector-instruction-heavy workload may cause a VXU of the processor core to consume more power and generate more localized heat.

To enable the processor device to mitigate the effects of high temperature, each processor core incorporates multiple thermal sensors (such as digital thermal sensors (DTSes), as a non-limiting example) to monitor temperatures at different locations within the processor. However, it is desirable to minimize the number of thermal sensors within the processor core, as each additional thermal sensor increases the area occupied by the processor core. Additionally, the placement of each thermal sensor within the processor core may not be optimal for monitoring the temperature at a particular point of interest (POI), such as one of the hot spots described above. This may result in large differences between temperature measurements at a thermal sensor location and the temperature at a POI. Finally, the latency in obtaining temperature measurements from thermal sensors in comparison with the potential rate of temperature increase may pose challenges to thermal management architecture.

SUMMARY OF THE DISCLOSURE

Aspects disclosed in the detailed description include performing thermal management based on temperature evolution models in processor devices. Related apparatus, methods, and computer-readable media are also disclosed. In this regard, a processor device provides a core cluster that comprises a plurality of processor cores and a cluster thermal management circuit. The cluster thermal management circuit is configured to receive one or more power consumption measurements for a corresponding one or more functional units of a processor core of the plurality of processor cores. The cluster thermal management circuit is further configured to receive one or more temperature measurements by a corresponding one or more thermal sensors external to a point of interest (POI), such as a hot spot, within the processor core. The cluster thermal management circuit then generates a predicted temperature at the POI based on a temperature evolution model that correlates the one or more power consumption measurements and the one or more temperature measurements with the predicted temperature at the POI. The cluster thermal management circuit determines whether the predicted temperature at the POI exceeds a thermal mitigation threshold. If so, the cluster thermal management circuit performs a thermal management operation. In this manner, the cluster thermal management circuit is able to control temperature at multiple POIs within a processor core without requiring a physical thermal sensor at each POI. In addition, the cluster thermal management circuit can control rapid evolution of temperature in the processor core (e.g., through a combination of clock throttling and dynamic voltage and frequency scaling (DVFS)) based on the temperature evolution characteristics of the core, and can achieve proactive temperature control.

In some aspects, the temperature evolution model comprises a transfer function model that comprises a plurality of inputs each representing a pre-silicon power consumption measurement of a functional unit of the one or more functional units, and a plurality of outputs each representing a pre-silicon temperature measurement by a thermal sensor of the one or more thermal sensors. The transfer function model is configured to model temperature evolution at each thermal sensor as a function of power consumed by each functional unit. The temperature evolution model in such aspects further comprises a gradient model configured to model a change in temperature between each thermal sensor and the POI. The temperature evolution model according to some aspects may be integrated into firmware of the cluster thermal management circuit.

In some aspects, generating the predicted temperature at the POI may comprise generating a first model representing a temperature at a thermal sensor of the one or more thermal sensors, using the temperature evolution model. The cluster thermal management circuit in such aspects also uses the temperature evolution model and the first model to generate a second model representing a temperature at the POI. In addition, the cluster thermal management circuit uses the temperature evolution model to generate a third model representing a boundary condition.

Some aspects may provide that performing the thermal management operation comprises the cluster thermal management circuit employing a clock throttling circuit to perform thermal management. In this regard, in such aspects, the cluster thermal management circuit calculates a power threshold for the processor core using the temperature evolution model, wherein the power threshold represents a maximum power that can be consumed by the processor core without exceeding the thermal mitigation threshold. The cluster thermal management circuit then determines whether a current power consumption of the processor core exceeds the power threshold. If so, the cluster thermal management circuit identifies a target clock throttling level that is lower than a current clock throttling level of the core cluster, and transmits the target clock throttling level to the clock throttling circuit.

According to some aspects, performing the thermal management operation may comprise the cluster thermal management circuit employing a DVFS circuit to perform thermal management. Accordingly, in such aspects, the cluster thermal management circuit may calculate one or more operating points for the core cluster using the temperature evolution model. Some such aspects may provide that calculating the one or more operating points may comprise the cluster thermal management circuit calculating a cost function, which may include predicting future temperature evolution based on a future temperature evolution filter. The cluster thermal management circuit may then generate a frequency change policy using the cost function. If the cluster thermal management circuit subsequently determines that the predicted temperature at the POI exceeds the thermal mitigation threshold, the cluster thermal management circuit performs the thermal management operation by selecting a target operating point from among the one or more operating points, wherein the target operating point is lower than a current operating point for the core cluster. Selecting the target operating point in some aspects may be based on based on the frequency change policy. The cluster thermal management circuit then transmits the target operating point to the DVFS circuit.

In another aspect, a processor device is provided. The processor device comprises a core cluster that includes a plurality of processor cores, and also comprises a cluster thermal management circuit. The cluster thermal management circuit is configured to receive one or more power consumption measurements for a corresponding one or more functional units of a processor core of the plurality of processor cores. The cluster thermal management circuit is further configured to receive one or more temperature measurements by a corresponding one or more thermal sensors external to a POI within the processor core. The cluster thermal management circuit is also configured to generate a predicted temperature at the POI based on a temperature evolution model that correlates the one or more power consumption measurements and the one or more temperature measurements with the predicted temperature at the POI. The cluster thermal management circuit is additionally configured to determine whether the predicted temperature at the POI exceeds a thermal mitigation threshold. The cluster thermal management circuit is further configured to, responsive to determining that the predicted temperature at the POI exceeds the thermal mitigation threshold, perform a thermal management operation.

In another aspect, a processor device is provided. The processor device comprises means for receiving one or more power consumption measurements for a corresponding one or more functional units of a processor core of a plurality of processor cores of a core cluster of the processor device. The processor device further comprises means for receiving one or more temperature measurements by a corresponding one or more thermal sensors external to a POI within the processor core. The processor device also comprises means for generating a predicted temperature at the POI based on a temperature evolution model that correlates the one or more power consumption measurements and the one or more temperature measurements with the predicted temperature at the POI. The processor device additionally comprises means for determining whether the predicted temperature at the POI exceeds a thermal mitigation threshold. The processor device further comprises means for performing a thermal management operation, responsive to determining that the predicted temperature at the POI exceeds the thermal mitigation threshold.

In another aspect, a method for performing thermal management based on temperature evolution models is provided. The method comprises determining, by a cluster thermal management circuit of a core cluster of a processor device, one or more power consumption measurements for a corresponding one or more functional units of a processor core of a plurality of processor cores of the core cluster. The method further comprises determining, by the cluster thermal management circuit, one or more temperature measurements by a corresponding one or more thermal sensors external to a POI within the processor core. The method also comprises generating, by the cluster thermal management circuit, a predicted temperature at the POI based on a temperature evolution model that correlates the one or more power consumption measurements and the one or more temperature measurements with the predicted temperature at the POI. The method additionally comprises determining, by the cluster thermal management circuit, that the predicted temperature at the POI exceeds a thermal mitigation threshold. The method further comprises, responsive to determining that the predicted temperature at the POI exceeds the thermal mitigation threshold, performing, by the cluster thermal management circuit, a thermal management operation.

In another aspect, a non-transitory computer-readable medium is disclosed. The non-transitory computer-readable medium stores computer-executable instructions that, when executed, cause a processor device of a processor-based device to receive one or more power consumption measurements for a corresponding one or more functional units of a processor core of a plurality of processor cores of a core cluster of the processor device. The computer-executable instructions further cause the processor device to receive one or more temperature measurements by a corresponding one or more thermal sensors external to a POI within the processor core. The computer-executable instructions also cause the processor device to generate a predicted temperature at the POI based on a temperature evolution model that correlates the one or more power consumption measurements and the one or more temperature measurements with the predicted temperature at the POI. The computer-executable instructions additionally cause the processor device to determine whether the predicted temperature at the POI exceeds a thermal mitigation threshold. The computer-executable instructions further cause the processor device to, responsive to determining that the predicted temperature at the POI exceeds the thermal mitigation threshold, perform a thermal management operation.

BRIEF DESCRIPTION OF THE FIGURES

FIGS. 3A-3D provide a flowchart illustrating exemplary operations performed by the processor device of FIG. 1 for performing thermal management based on temperature evolution models, according to some aspects.

DETAILED DESCRIPTION

Figure 1:
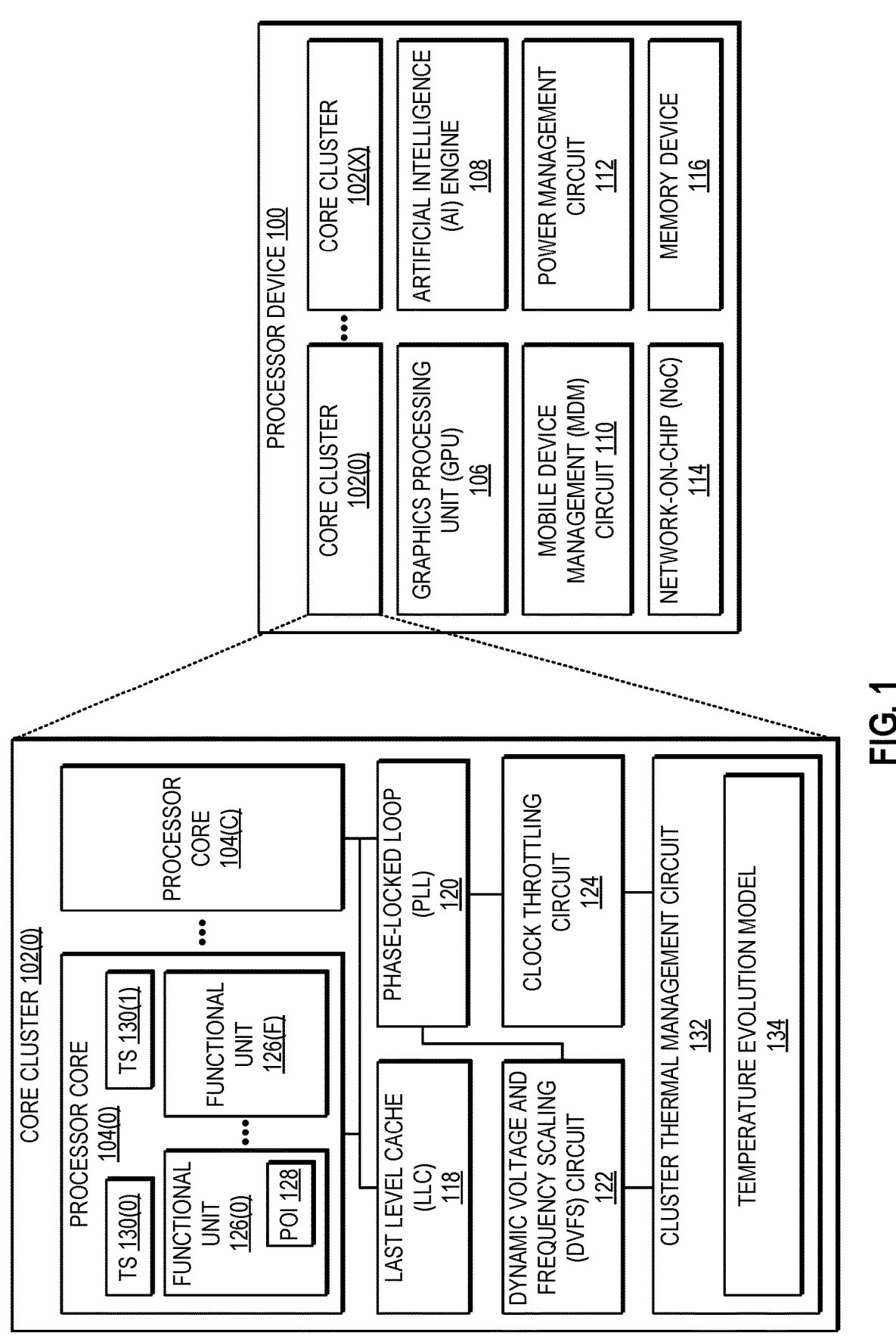
FIG. 1 is a block diagram of an exemplary processor-based device that includes a core cluster that comprises a cluster thermal management circuit configured to perform thermal management based on temperature evolution models, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. The terms "first," "second," and the like are used herein to distinguish between similarly named elements, and are not to be interpreted as indicating an ordinal relationship between such elements unless expressly described as such herein.

Aspects disclosed in the detailed description include performing thermal management based on temperature evolution models in processor devices. Related apparatus, methods, and computer-readable media are also disclosed. In this regard, a processor device provides a core cluster that comprises a plurality of processor cores and a cluster thermal management circuit. The cluster thermal management circuit is configured to receive one or more power consumption measurements for a corresponding one or more functional units of a processor core of the plurality of processor cores. The cluster thermal management circuit is further configured to receive one or more temperature measurements by a corresponding one or more thermal sensors external to a point of interest (POI), such as a hot spot, within the processor core. The cluster thermal management circuit then generates a predicted temperature at the POI based on a temperature evolution model that correlates the one or more power consumption measurements and the one or more temperature measurements with the predicted temperature at the POI. The cluster thermal management circuit determines whether the predicted temperature at the POI exceeds a thermal mitigation threshold. If so, the cluster thermal management circuit performs a thermal management operation. In this manner, the cluster thermal management circuit is able to control temperature at multiple POIs within a processor core without requiring a physical thermal sensor at each POI. In addition, the cluster thermal management circuit can control rapid evolution of temperature in the processor core (e.g., through a combination of clock throttling and dynamic voltage and frequency scaling (DVFS)) based on the temperature evolution characteristics of the core, and can achieve proactive temperature control.

In some aspects, the temperature evolution model comprises a transfer function model that comprises a plurality of inputs each representing a pre-silicon power consumption measurement of a functional unit of the one or more functional units, and a plurality of outputs each representing a pre-silicon temperature measurement by a thermal sensor of the one or more thermal sensors. The transfer function model is configured to model temperature evolution at each thermal sensor as a function of power consumed by each functional unit. The temperature evolution model in such aspects further comprises a gradient model configured to model a change in temperature between each thermal sensor and the POI. The temperature evolution model according to some aspects may be integrated into firmware of the cluster thermal management circuit.

In some aspects, generating the predicted temperature at the POI may comprise generating a first model representing a temperature at a thermal sensor of the one or more thermal sensors, using the temperature evolution model. The cluster thermal management circuit in such aspects also uses the temperature evolution model and the first model to generate a second model representing a temperature at the POI. In addition, the cluster thermal management circuit uses the temperature evolution model to generate a third model representing a boundary condition.

Some aspects may provide that performing the thermal management operation comprises the cluster thermal management circuit employing a clock throttling circuit to perform thermal management. In this regard, in such aspects, the cluster thermal management circuit calculates a power threshold for the processor core using the temperature evolution model, wherein the power threshold represents a maximum power that can be consumed by the processor core without exceeding the thermal mitigation threshold. The cluster thermal management circuit then determines whether a current power consumption of the processor core exceeds the power threshold. If so, the cluster thermal management circuit identifies a target clock throttling level that is lower than a current clock throttling level of the core cluster, and transmits the target clock throttling level to the clock throttling circuit.

According to some aspects, performing the thermal management operation may comprise the cluster thermal management circuit employing a DVFS circuit to perform thermal management. Accordingly, in such aspects, the cluster thermal management circuit may calculate one or more operating points for the core cluster using the temperature evolution model. Some such aspects may provide that calculating the one or more operating points may comprise the cluster thermal management circuit calculating a cost function, which may include predicting future temperature evolution based on a future temperature evolution filter. The cluster thermal management circuit may then generate a frequency change policy using the cost function. If the cluster thermal management circuit subsequently determines that the predicted temperature at the POI exceeds the thermal mitigation threshold, the cluster thermal management circuit performs the thermal management operation by selecting a target operating point from among the one or more operating points, wherein the target operating point is lower than a current operating point for the core cluster. Selecting the target operating point in some aspects may be based on based on the frequency change policy. The cluster thermal management circuit then transmits the target operating point to the DVFS circuit.

In this regard, FIG. 1 is a block diagram of an exemplary processor device 100 (also referred to a "processor" or a "CPU"). The processor device 100 may comprise an in-order or an out-of-order processor (OoP), and/or may be one of a plurality of processor devices 100. Examples of the processor device 100 may include, but are not limited to, a digital signal processor (DSP), general-purpose microprocessor, application specific integrated circuit (ASIC), field programmable logic array (FPGA), or other equivalent integrated or discrete logic circuitry.

As seen in FIG. 1, the processor device 100 comprises a plurality of core clusters 102(0)-102(X), each of which comprises a plurality of processor cores such as the processor cores 104(0)-104(C) of the core cluster 102(0). The processor device 100 in the example of FIG. 1 also comprises a graphics processing unit (GPU) 106 for performing graphical operations. As a non-limiting example, the GPU 106 may comprise a dedicated hardware unit having fixed functionality and programmable components for rendering graphics and executing GPU applications. The GPU 106 may also include a DSP, general-purpose microprocessor, ASIC, FPGA, or other equivalent integrated or discrete logic circuitry, which are not shown in FIG. 1 for the sake of clarity.

The processor device 100 in the example of FIG. 1 further comprises additional exemplary elements, including an artificial intelligence (AI) engine 108, a mobile device management (MDM) circuit 110, a power management circuit 112, a network-on-chip (NoC) 114, and a memory device 116. The AI engine 108 of the processor device 100 comprises circuitry and logic for providing AI-based functionality such as search, speech recognition, text and/or image generation, and the like, as non-limiting examples. The MDM circuit 110 provides functionality for provisioning, configuring, updating, and/or securing a mobile device into which the processor device 100 is integrated. The power management circuit 112 provides high-level performance and power management functionality for the processor device 100 as a whole, while the NoC 114 is configured to manage communications between the different devices that comprise the processor device 100. Finally, the memory device 116 provides storage of and access to data used by the processor device 100, and, in some aspects, may comprise a Double Data Rate (DDR) Synchronous Dynamic Random-Access Memory (SDRAM) device, as a non-limiting example.

FIG. 1 also illustrates exemplary elements of the core cluster 102(0) in greater detail. The processor cores 104(0)-104(C) of the core cluster 102(0) are communicatively coupled to a last-level cache (LLC) 118 that stores frequently-accessed data for quicker access, and to a phase-locked loop (PLL) 120 that provides a clock signal to the processor cores 104(0)-104(C) and the LLC 118. The frequency and voltage at which the processor cores 104(0)-104(C) of the core cluster 102(0) operate is controlled by a DVFS circuit 122, which is configured to select an operating point (i.e., a voltage and clock frequency combination) at which the core cluster 102(0) will operate. The core cluster 102(0) also includes a clock throttling circuit 124 that is configured to control the clock frequency at which the core cluster 102(0) by, e.g., throttling the core cluster 102(0) so that the core cluster 102(0) operates at a clock frequency lower than a maximum clock frequency supported by the voltage at which the core cluster 102(0) is operating. It is to be understood that, while FIG. 1 only shows exemplary elements of the core cluster 102(0), each of the core clusters 102(0)-102(X) include elements corresponding to the illustrated elements of the core cluster 102(0).

FIG. 1 further illustrates exemplary elements of the processor core 104(0) in greater detail. As seen in FIG. 1, the processor core 104(0) comprises a plurality of functional units 126(0)-126(F), each of which includes circuitry for performing a specific subset of operations or functions for the processor core 104(0) in response to execution of instructions (not shown) by the processor core 104(0). The functional units 126(0)-126(F), as non-limiting examples, may comprise an integer execution unit (IXU) configured to perform integer operations, a vector execution unit (VXU)

configured to perform vector operations, an arithmetic logic unit (ALU) configured to perform logical operations, and the like.

The processor device 100 of FIG. 1 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages. It is to be understood that some aspects of the processor device 100, the core cluster 102(0), and/or the processor cores 104(0)-104(C) may include elements in addition to or instead of those illustrated in FIG. 1, and/or may include more or fewer of the elements illustrated in FIG. 1. For example, the processor device 100 may further include caches, controllers, communications buses, and/or persistent storage devices, which are omitted from FIG. 1 for the sake of clarity.

As noted above, the functional units 126(0)-126(F) tend to exhibit higher power densities relative to other elements of the processor core 104(0). Depending on the type of workload being executed by the processor core 104(0), power consumption by the processor core 104(0) at a given time may be concentrated within specific ones of the functional units 126(0)-126(F). These points of higher power consumption result in localized "hot spots," referred to herein as POIs such as the POI 128 within the functional unit 126(0), where the temperature is higher than other regions within the processor core 104(0). The processor core 104(0) provides thermal sensors (captioned as "TS" in FIG. 1) 130(0)-130(1) to monitor temperatures at different locations within the processor core 104(0). Temperature measurements provided by the thermal sensors 130(0)-130(1) may be used by the processor core 104(0) to mitigate the effects of high temperature. However, the number and placement of the thermal sensors 130(0)-130(1) within the processor core 104(0) may not be optimal for monitoring the temperature at, e.g., the POI 128, which may result in large differences between temperature measurements at the thermal sensors 130(0)-130(1) and the temperature at the POI 128. Moreover, the latency in obtaining temperature measurements from the thermal sensors 130(0)-130(1), compared to the potential rate of temperature increase, may pose challenges to thermal management architecture.

In this regard, the core cluster 102(0) provides a cluster thermal management circuit 132 that is configured to perform thermal management based on a temperature evolution model 134. As discussed in greater detail below, the temperature evolution model 134 enables the cluster thermal management circuit 132 to use temperature measurements from the thermal sensors 130(0)-130(1) and power consumption measurements for the processor core 104(0) to inferentially determine a predicted temperature at the POI 128, and to perform an appropriate thermal management operation (e.g., using the clock throttling circuit 124 and/or the DVFS circuit 122) if the predicted temperature exceeds a thermal mitigation threshold. The cluster thermal management circuit 132 is thus able to monitor and control temperature at multiple locations within the processor core 104(0) without requiring a physical thermal sensor at each location, and can control rapid evolution of temperature in the processor core using thermal management operations. In particular, the cluster thermal management circuit 132 may use the clock throttling circuit 124 to control rapid increases in temperature, and may further use the DVFS circuit 122 for slower but more efficient temperature management.

Figure 2:
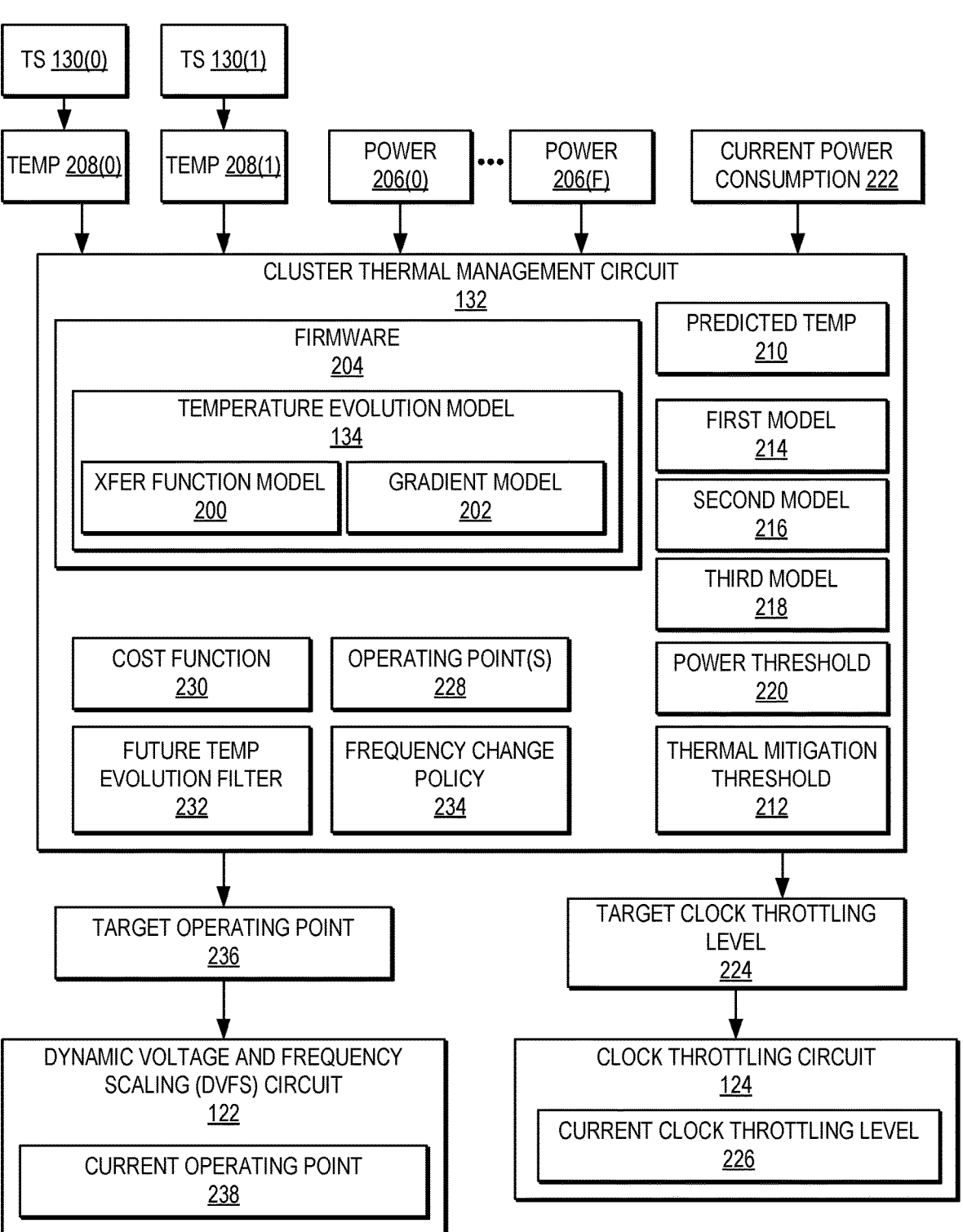
FIG. 2 is a block diagram illustrating exemplary elements of and information flows to and from the cluster thermal management circuit of FIG. 1 for performing thermal management, according to some aspects.

To illustrate exemplary elements of and information flows to and from the cluster thermal management circuit 132 of FIG. 1 for performing thermal management based on the temperature evolution model 134, FIG. 2 is provided. As seen in FIG. 2, the temperature evolution model 134 in some aspects may comprise multiple-input multiple-output (MIMO) models including a transfer function model (captioned as "XFER FUNCTION MODEL" in FIG. 2) 200 and a gradient model 202. The transfer function model 200 in such aspects may comprises a plurality of inputs (not shown) that each represent a pre-silicon power consumption measurement of functional units such as the functional units 126(0)-126(F) of FIG. 1, as well as a plurality of outputs (not shown) each representing a pre-silicon temperature measurement by a thermal sensor such as the thermal sensors 130(0)-130(1) of FIG. 1. The transfer function model 200 is configured to model temperature evolution at each of the thermal sensors 130(0)-130(1) as a function of power consumed by each of the functional units 126(0)-126(F). The gradient model 202, in turn, is configured to model a change in temperature between each of the thermal sensors 130(0)-130(1) and the POI 128.

Tables 1 and 2 below illustrate an exemplary transfer function model 200 and an exemplary gradient model 202, respectively, that together may comprise the temperature evolution model 134. In the example of Table 1, each transfer function comprises a three (3)-input two (2)-output model that represents temperature (T) evolution at thermal sensor locations associated with each of two (2) functional units (an IXU and a VXU, in this example) of a processor core. The temperature evolution is modeled as a function of power (P) injected into the IXU and the VXU, and power injected in the rest of the processor core. Each transfer function in the example of Table 1 may have three (3) poles and six (6) zeros.

TABLE 1

$$T_{dts}^{ixu}(Z^{-1}) = \frac{A_{11}(Z^{-1})}{B_{11}(Z^{-1})} P_{rest}(Z^{-1}) +$$

$$\frac{A_{12}(Z^{-1})}{B_{12}(Z^{-1})} P_{ixu}(Z^{-1}) + \frac{A_{13}(Z^{-1})}{B_{13}(Z^{-1})} P_{vxu}(Z^{-1})$$

$$T_{dts}^{vxu}(Z^{-1}) = \frac{A_{21}(Z^{-1})}{B_{21}(Z^{-1})} P_{rest}(Z^{-1}) +$$

$$\frac{A_{22}(Z^{-1})}{B_{22}(Z^{-1})} P_{ixu}(Z^{-1}) + \frac{A_{23}(Z^{-1})}{B_{23}(Z^{-1})} P_{vxu}(Z^{-1})$$

The gradient model 202 in the example of Table 2 likewise comprises a three (3)-input two (2)-output model that represents a temperature gradient from each thermal sensor associated with the IXU and the DXU and a hotspot (HS) within each of the TXU and VXU, taking into account the power distribution in the IXU, VXU, and the rest of the processor core.

TABLE 2

$$\Delta T_{hs}^{ixu}(Z^{-1}) = \frac{C_{11}(Z^{-1})}{D_{11}(Z^{-1})} P_{rest}(Z^{-1}) +$$

$$\frac{C_{12}(Z^{-1})}{D_{12}(Z^{-1})} P_{ixu}(Z^{-1}) + \frac{C_{13}(Z^{-1})}{D_{13}(Z^{-1})} P_{vxu}(Z^{-1})$$

TABLE 2-continued $$\Delta T_{hs}^{vxu}(Z^{-1}) = \frac{C_{21}(Z^{-1})}{D_{21}(Z^{-1})} P_{rest}(Z^{-1}) +$$

$$\frac{C_{22}(Z^{-1})}{D_{22}(Z^{-1})} P_{ixu}(Z^{-1}) + \frac{C_{23}(Z^{-1})}{D_{23}(Z^{-1})} P_{vxu}(Z^{-1})$$

Where $\Delta T_{hs}^{ixu} = T_{hs}^{ixu} - T_{dts}^{ixu}$ and $\Delta T_{hs}^{vxu} = T_{hs}^{vxu} - T_{dts}^{vxu}$ The models illustrated in Tables 1 and 2 may be built using pre-silicon thermal simulation data, and would not be expected to vary in a real processor core as the models would be focused only on small time-constant evolution of temperature (e.g., on the order of five (5) to 10 milliseconds). In some aspects, the temperature evolution model 134, including the transfer function model 200 and the gradient model 202, may be integrated into a firmware 204 of the cluster thermal management circuit 132 of the core cluster 102(0).

With continuing reference to FIG. 2, the cluster thermal management circuit 132 in exemplary operation receives one or more power consumption measurements (captioned as "POWER" in FIG. 2) 206(0)-206(F) for a corresponding one or more of the functional units 126(0)-126(F) of FIG. 1. The cluster thermal management circuit 132 also receives one or more temperature measurements (captioned as "TEMP" in FIG. 2) 208(0)-208(1) by a corresponding one or more of the thermal sensors 130(0)-130(1) of FIG. 1, which are external to the POI 128. The cluster thermal management circuit 132 then generates a predicted temperature (captioned as "PREDICTED TEMP" in FIG. 2) 210 at the POI 128 based on the temperature evolution model 134, which correlates the one or more power consumption measurements 206(0)-206(F) (collectively referred to as "power consumption measurements 206"), and the one or more temperature measurements 208(0)-208(1) with the predicted temperature 210 at the POI 128. The cluster thermal management circuit 132 determines that the predicted temperature 210 at the POI 128 exceeds a thermal mitigation threshold 212. The cluster thermal management circuit 132, in response to determining that the predicted temperature 210 at the POI 128 exceeds the thermal mitigation threshold 212, performs a thermal management operation.

In some aspects, generating the predicted temperature 210 at the POI 128 may comprise the cluster thermal management circuit 132 using the temperature evolution model 134 to generate a first model 214 that represents a temperature at a thermal sensor of the one or more thermal sensors 130(0)-130(1). The cluster thermal management circuit 132 also uses the temperature evolution model 134 and the first model 214 to generate a second model 216 that represents a temperature at the POI 128. The first model 214 and the second model 216 each may be dependent on power dissipation within the functional units 126(0)-126(F) of the processor core 104(0), as well as on transfer impedance from cross-clusters which may introduce error into the models. In addition, the cluster thermal management circuit 132 uses the temperature evolution model 134 to generate a third model 218 representing a boundary condition.

Table 3 below illustrates an exemplary first model 214 according to some aspects, with terms used in the first model 214 defined in Table 4 below:

TABLE 3

$$Tsens(k, s) = \sum_{i=1}^{n} \gamma_i^s Tsens(k - i, s) +$$

$$\sum_{c=1}^{4}\sum_{i=1}^{u}\sum_{j=0}^{m}\left(\alpha_{ij,c}^s P_{i,c}(k-j)\right) + \sum_{i=1}^{1}\sum_{j=0}^{m'}\beta_i\delta_i(k-j)$$

$$\hat{T}sens(k, s) = \sum_{i=1}^{n} \gamma_i^s Tsens(k - i, s) + \sum_{c=1}^{4}\sum_{i=1}^{u}\sum_{j=0}^{m}\left(\alpha_{ij,c}^s P_{i,c}(k-j)\right)$$

TABLE 4

| $\alpha_{ij,c}^s$ | Coefficients from model relating sensor s temperature to functional unit power ($i^{th}$ unit in the $c^{th}$ processor core) |
|---|---|
| $P_{i,c}(k)$ | Power number of $i^{th}$ functional unit in the $c^{th}$ core over the interval k |
| $\beta_i$ | Intercluster transfer impedance coefficients (known to the core cluster) for the $i^{th}$ core cluster in the neighborhood |
| $\gamma_i^s$ | Coefficients associated with past temperature readings of sensor; determine poles of the model |
| $\delta_i$ | Power from the $i^{th}$ adjacent cluster (not known to a core cluster) |
| Tsens(k, s) | Temperature of sensor s at time k |
| $\hat{T}$sens(k,s) | Estimated temperature of sensor s at instant k |

Note that the portion of the first equation before the second addition sign (+) in Table 3 accounts for power dissipated within a core cluster, while the remaining portion represents error due to cross cluster transfer and inaccuracies in power estimation. The second equation in Table 3 estimates the temperature of sensor s at instant k using only information available to the core cluster.

Table 5 below illustrates an exemplary second model 216 according to some aspects, with terms used in the second model 216 defined in Table 6 below:

TABLE 5

$$T_{hs}(k, l) = \sum_{s=0}^{N} a_s Tsens(k - 1, s) + \sum_{c=1}^{4}\sum_{i=1}^{u}\sum_{j=0}^{m}\left(\phi_{ij,c}^1 P_{i,c}(k-j)\right)$$

TABLE 6

| $T_{hs}(k, l)$ | Estimated hotspot temperature at time instance k and location l, where each location l is a predefined location with a processor core of a core cluster |
|---|---|
| $\phi_{ij,c}^l$ | Coefficients from model relating hot spot temperature to intracluster unit power |

Continuing to refer to FIG. 2, in some aspects, performing the thermal management operation may comprise the cluster thermal management circuit 132 employing the clock throttling circuit 124 to perform thermal management. The clock throttling circuit 124 in such aspects is able to control rapid temperature increases more rapidly than the DVFS circuit 122 (although the linear power reduction that results from using the clock throttling circuit 124 is less efficient than power reduction resulting from using the DVFS circuit 122). Such aspects may provide that the cluster thermal management circuit 132 performs the thermal management operation by first calculating a power threshold 220 for the processor core 104(0) using the temperature evolution model 134. The power threshold 220 represents a maximum power that can be consumed by the processor core 104(0) without exceeding the thermal mitigation threshold 212. The cluster thermal management circuit 132 then determines whether a current power consumption 222 of the processor core 104(0) exceeds the power threshold 220. If so, the cluster thermal management circuit 132 identifies a target clock throttling level 224 that is lower than a current clock throttling level 226 of the core cluster 102(0), and transmits the target clock throttling level 224 to the clock throttling circuit 124. The clock throttling circuit 124 then performs clock throttling in conventional fashion, which has the effect of lowering the temperature of the processor core 104(0) at the POI 128.

The power threshold 220 in some such aspects may be calculated using a thermal model based on the thermal mitigation threshold 212, referred to as $T_{lmct}$ below. Because the thermal model is based on intracluster unit power, while the power threshold 220 is cluster-based, it is assumed that $$P_{i,c}^{bud}(k) = \rho_{i,c} * P_c^{bud}(k),$$

where $\rho_{i,c}$ is determined based on previous measurements of total core power of processor core c and unit power of unit i.

The thermal model then comprises an optimization problem for P_budget (k, core c=1,2,3,4), as shown in Table 7 below:

TABLE 7

Subject to: $\displaystyle \text{Max}\sum_{c=1}^{4} P_c^{bud}(k)$

Subject to:

$T_{imct} = \hat{T}sens(k - i, s)$ $$T_{lmct} = \hat{T}sens(k, s) \geq \sum_{i=1}^{n}\gamma_i^s Tsens(k - i, s)$$

$$+ \sum_{c=1}^{4}\sum_{i=1}^{u}\alpha_{ij,c}^s \rho_{i,c} P_c^{bud}(k-1) + \sum_{c=1}^{4}\sum_{i=1}^{u}\sum_{j=2}^{m}\left(\alpha_{ij,c}^s P_{i,c}(k-j)\right)$$

Still referring to FIG. 2, some aspects may provide that performing the thermal management operation may comprise the cluster thermal management circuit 132 employing the DVFS circuit 122 to perform thermal management. As noted above, the DVFS circuit 122 may provide slower but more efficient thermal management compared to the clock throttling circuit 124. Accordingly, in such aspects, the cluster thermal management circuit 132 in some aspects may calculate one or more operating points 228 for the core cluster 102(0) using the temperature evolution model 134. Calculating the one or more operating points 228 may involve calculating a cost function 230, which may employ a future temperature evolution filter (captioned as "FUTURE TEMP EVOLUTION FILTER" in FIG. 2) 232 to predict future temperature evolution. The cluster thermal management circuit 132 then generates a frequency change policy 234 using the cost function 230.

Subsequently, the cluster thermal management circuit 132 may perform the thermal management operation by selecting a target operating point 236 (e.g., based on the frequency change policy 234) from among the one or more operating points 228, where the target operating point 236 is lower than a current operating point 238 for the core cluster 102(0). The cluster thermal management circuit 132 then transmits the target operating point 236 to the DVFS circuit 122, which sets the voltage and frequency for the core cluster 102(0) based on the target operating point 236 in conventional fashion.

One challenge to using the DVFS circuit 122 in this manner is that the temperature measurements 208(0)-208(1) from the thermal sensors 130(0)-130(1) may not be available simultaneously to the cluster thermal management circuit 132. Because DVFS latency is variable and is larger than thermal sensor update latency, a cost function based on history is purely reactive, and may lead to inefficiencies due to large delay in application. Thus, in some aspects, the cost function 230 may comprise the function illustrated below in Table 8, with associated terms defined in Table 9. The objective of this approach is to employ faster power telemetry (e.g., the power consumption measurements 206(0)-206 (F) of FIG. 2) over slower temperature sensor telemetry (e.g., the temperature measurements 208(0)-208(1)) when optimizing the cost.

TABLE 8

$$\text{Cost}(k, c) = \sum_{j=-h}^{f} w_j \big(T_{sp}(k + j) - \hat{T}sens(k + j)\big)^{\wedge}2$$

TABLE 9

| | |
|---|---|
| $T_{sp}$ (k) | Set point at time instance k |
| $\hat{T}sens(k)$ | Estimated sensor temperature at time instance k |
| $w_j$ | Weights. In some aspects, a weight may be lower the further in the past and/or future the associated term is |

It is to be noted that the cost function in Table 8 may have a causal and look-ahead contribution. The look-ahead contribution may be achieved by assuming f>=1. Such look-ahead requires a dynamic cost (CDYN) prediction model, discussed in greater detail below. It is to be further noted that the look-ahead horizon is based on expected DVFS latency of the DVFS circuit 122.

Some aspects may provide that the operations performed by the cluster thermal management circuit 132 for selecting the target operating point 236 may comprise using the equation in Table 10 below to select a frequency for the core cluster 102(0).

TABLE 10

$$F_{Ncc} = \min_{i} (\text{argmin Cost}(k, \text{core}_i))$$

Using the equation in Table 10, the cost function is minimized on a per-core basis and used to determine the frequency for the core cluster that optimizes the cost for that processor core. The minimum of the above-generated frequencies is selected to generate a target cluster frequency and thus the target operating point 236. Assuming $P_{i,c}(k)$ represents the power consumed by the $i^{th}$ unit of processor core c in the $k^{th}$ instance (i.e., over the window [(k−1) T, KT] when running at a voltage V and effective frequency F_eff, then the equation in Table 11 below calculates the workload characteristic $Cdyn_{i,c}(k)$ in the interval [k−1, k] for the $i^{th}$ unit of the $m^{th}$ core in the core cluster. $Plkg_{i,c}(V, T)$ represents the leakage power of the $i^{th}$ unit of $c^{th}$ processor core in a core cluster at V and T.

TABLE 11

$$Cdyn_{i,c}(k) = [P_{i,c}(k) - Plkg_{i,c}(V, T)]/(V^{\wedge}2 * F\_eff)$$

The Cost (k, c) can be recast in terms of optimization variable F (representing DVFS frequency) as the equation in Table 12 below:

TABLE 12

$$\text{Cost}(k, c) = \sum_{r=-h}^{f} w_r(T_{sp}(k + r)$$

− (terms dependent on measured temp outside opt window) −
$SSSa_{ij,m}(CDYN_{i,c}(k + r − j)$
$* g(F)^{\wedge}2*F + g(F)*ILKG_{i,c}(g(F), T)) +$
$SSSa_{ij,c}P_{i,c}(k + r − j))^{\wedge}2$ Here, Voltage V=g(F), which represents the voltage/frequency curve of the core cluster, and the term $SSSa_{ij,c}P_{i,c}$ (k+r−j) represents power contributions outside the optimization window. Note that the cost function is only a function of frequency of the processor core, and further that the frequency optimization space is a finite number of points. An optimal solution can be selecting by computing the cost function for all the operating points.

As noted above, proactive temperature management requires that temperature evolution in the future be predicted. However, future temperature evolution depends on the power dissipated in the core cluster, and its neighboring core clusters, in the future. Because this information is not known at a given time t, some aspects provide the future temperature evolution filter 232 to predict CDYN at a future time based on past information. In this regard, some aspects may provide the future temperature evolution filter 232 that operates to predict CDYN and therefore a corresponding temperature evolution. In such aspects, the future temperature evolution filter 232 may use a Recursive Least Squares (RLS) formulation. Knowing P(k) (the power consumed in a time interval [k−1, k]) and calculating CDYN using the equation in Table 11 above, predicted CDYN in a first lookahead interval from time instance k can be calculated using the equation in Table 13 below:

TABLE 13

$$\hat{C}dyn_{i,c}(k + 1 \mid k) = \sum_{f=0}^{f=l} \theta_{i,c}^{k}(f)Cdyn_{i,c}(k - f)$$

The filter $$\{\theta_{i,}^{k}\}_{f=0}^{l}$$

in Table 13 represents the filter at the time instance k. Filter coefficients are derived by minimizing a quadratic error with forgetting factor 1 to reduce the contribution of the past samples. In some aspects, the value of 1 is 0.9 and one (1), which improves stability but slows down adaptation.

A parameter update equation is provided in Table 14 below:

TABLE 14

$$\theta_{i,c}^{k} = \theta_{i,c}^{k-1} + g_k\left(\mathrm{Cdyn}_{i,cc}^{k} - \sum_{f=0}^{f=l} \theta_{i,c}^{k-1}(f)\mathrm{Cdyn}_{i,c}(k-f)\right)$$

In the parameter update equation, $g_k$ represents the gain of adaptation, and multiplies the a priori error.

To illustrate exemplary operations performed by the processor device 100 of FIG. 1 for performing thermal management based on temperature evolution models according to some aspects, FIGS. 3A-3D provide a flowchart illustrating exemplary operations 300. For the sake of clarity, elements of FIGS. 1 and 2 are referenced in describing FIGS. 3A-3D. It is to be understood that, in some aspects, some of the exemplary operations 300 may be performed in an order other than that illustrated herein, and/or may be omitted.

The exemplary operations 300 begin in FIG. 3A with a cluster thermal management circuit of a core cluster of a processor device (e.g., the cluster thermal management circuit 132 of the core cluster 102(0) of the processor device 100 of FIG. 1) receiving one or more power consumption measurements (such as the power consumption measurements 206 of FIG. 2) for a corresponding one or more functional units of a processor core of a plurality of processor cores (e.g., the functional units 126(0)-126(F) of the processor core 104(0) of the plurality of processor cores 104(0)-104(C) of FIG. 1) of the core cluster 102(0) (block 302). The cluster thermal management circuit 132 also receives one or more temperature measurements (such as the one or more temperature measurements 208(0)-208(1) of FIG. 2) by a corresponding one or more thermal sensors (e.g., the one or more thermal sensors 130(0)-130(1) of FIG. 1) external to a POI (such as the POI 128 of FIG. 1) within the processor core 104(0) (block 304).

The cluster thermal management circuit 132 then generates a predicted temperature (e.g., the predicted temperature 210 of FIG. 2) at the POI 128 based on a temperature evolution model (such as the temperature evolution model 134 of FIG. 1) that correlates the one or more power consumption measurements 206 and the one or more temperature measurements 208(0)-208(1) with the predicted temperature 210 at the POI 128 (block 306). In some aspects, the operations of block 306 for generating the predicted temperature 210 at the POI 128 may comprise the cluster thermal management circuit 132 using the temperature evolution model 134 to generate a first model (such as the first model 214 of FIG. 2) representing a temperature at a thermal sensor of the one or more thermal sensors 130(0)-130(1) (block 308). The cluster thermal management circuit 132 also uses the temperature evolution model 134 and the first model 214 to generate a second model (e.g., the second model 216 of FIG. 2) representing a temperature at the POI 128 (block 310). In addition, the cluster thermal management circuit 132 uses the temperature evolution model 134 to generate a third model (such as the third model 218 of FIG. 2) representing a boundary condition (block 312). The exemplary operations 300 in some aspects may continue at block 314 of FIG. 3B.

Figure 3B:
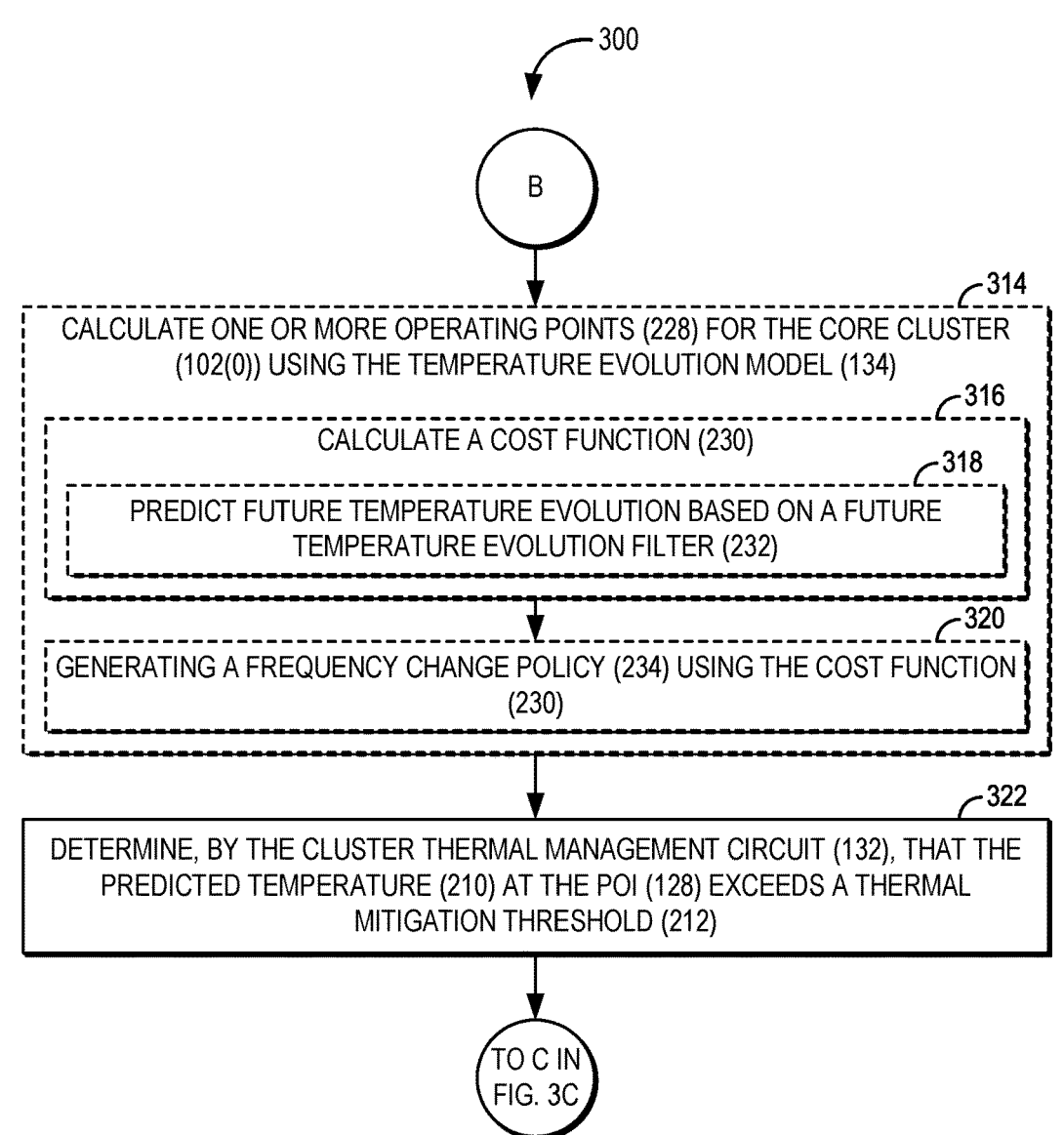

Referring now to FIG. 3B, the exemplary operations 300 according to some aspects may continue with the cluster thermal management circuit 132 calculating one or more operating points (such as the operating point(s) 228 of FIG. 2) for the core cluster 102(0) using the temperature evolution model 134 (block 314). Some such aspects may provide that the operations of block 314 for calculating the one or more operating points 228 may comprise the cluster thermal management circuit 132 calculating a cost function (e.g., the cost function 230 of FIG. 2) (block 316). The operations of block 316 for calculating the cost function 230 in some aspects may include the cluster thermal management circuit 132 predicting future temperature evolution based on a future temperature evolution filter (such as the future temperature evolution filter 232 of FIG. 2) (block 318). The cluster thermal management circuit 132 may then generate a frequency change policy (e.g., the frequency change policy 234 of FIG. 2) using the cost function 230 (block 320). The cluster thermal management circuit 132 determines that the predicted temperature 210 at the POI 128 exceeds a thermal mitigation threshold (such as the thermal mitigation threshold 212 of FIG. 2) (block 322). The exemplary operations 300 then continue at block 324 of FIG. 3C.

Turning now to FIG. 3C, the exemplary operations 300 continue with the cluster thermal management circuit 132, in response to determining that the predicted temperature 210 at the POI 128 exceeds the thermal mitigation threshold 212, performing a thermal management operation (block 324). In some aspects, the operations of block 324 for performing the thermal management operation may comprise the cluster thermal management circuit 132 employing a clock throttling circuit (such as the clock throttling circuit 124 of FIG. 1) to perform thermal management. In this regard, in such aspects, the cluster thermal management circuit 132 calculates a power threshold (e.g., the power threshold 220 of FIG. 2) for the processor core 104(0) using the temperature evolution model 134, wherein the power threshold 220 represents a maximum power that can be consumed by the processor core 104(0) without exceeding the thermal mitigation threshold 212 (block 326). The cluster thermal management circuit 132 then determines whether a current power consumption (such as the current power consumption 222 of FIG. 2) of the processor core 104(0) exceeds the power threshold 220 (block 328).

If the cluster thermal management circuit 132 determines that the current power consumption 222 by the processor core 104(0) exceeds the power threshold 220, a series of operations are performed (block 330). The cluster thermal management circuit 132 identifies a target clock throttling level (e.g., the target clock throttling level 224 of FIG. 2) that is lower than a current clock throttling level (e.g., the current clock throttling level 226 of FIG. 2) of the core cluster 102(0) (block 332). The cluster thermal management circuit 132 then transmits the target clock throttling level 224 to the clock throttling circuit 124 (block 334). The exemplary operations 300 according to some aspects may continue at block 336 of FIG. 3D.

With continuing reference to FIG. 3D, some aspects may provide that the operations of block 324 for performing the thermal management operation may comprise the cluster thermal management circuit 132 employing a DVFS circuit (such as the DVFS circuit 122 of FIG. 1) to perform thermal management. Accordingly, in such aspects, the cluster thermal management circuit 132 may select a target operating point (e.g., the target operating point 236 of FIG. 2) from among the one or more operating points 228, wherein the target operating point 236 is lower than a current operating point (such as the current operating point 238 of FIG. 2) for the core cluster 102(0) (block 336). The operations of block 336 for selecting the target operating point 236 in some aspects may be based on based on the frequency change policy 234 (block 338). The cluster thermal management circuit 132 then transmits the target operating point 236 to the DVFS circuit 122 (block 340).

The processor device according to aspects disclosed herein and discussed with reference to FIG. 1 may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 4:
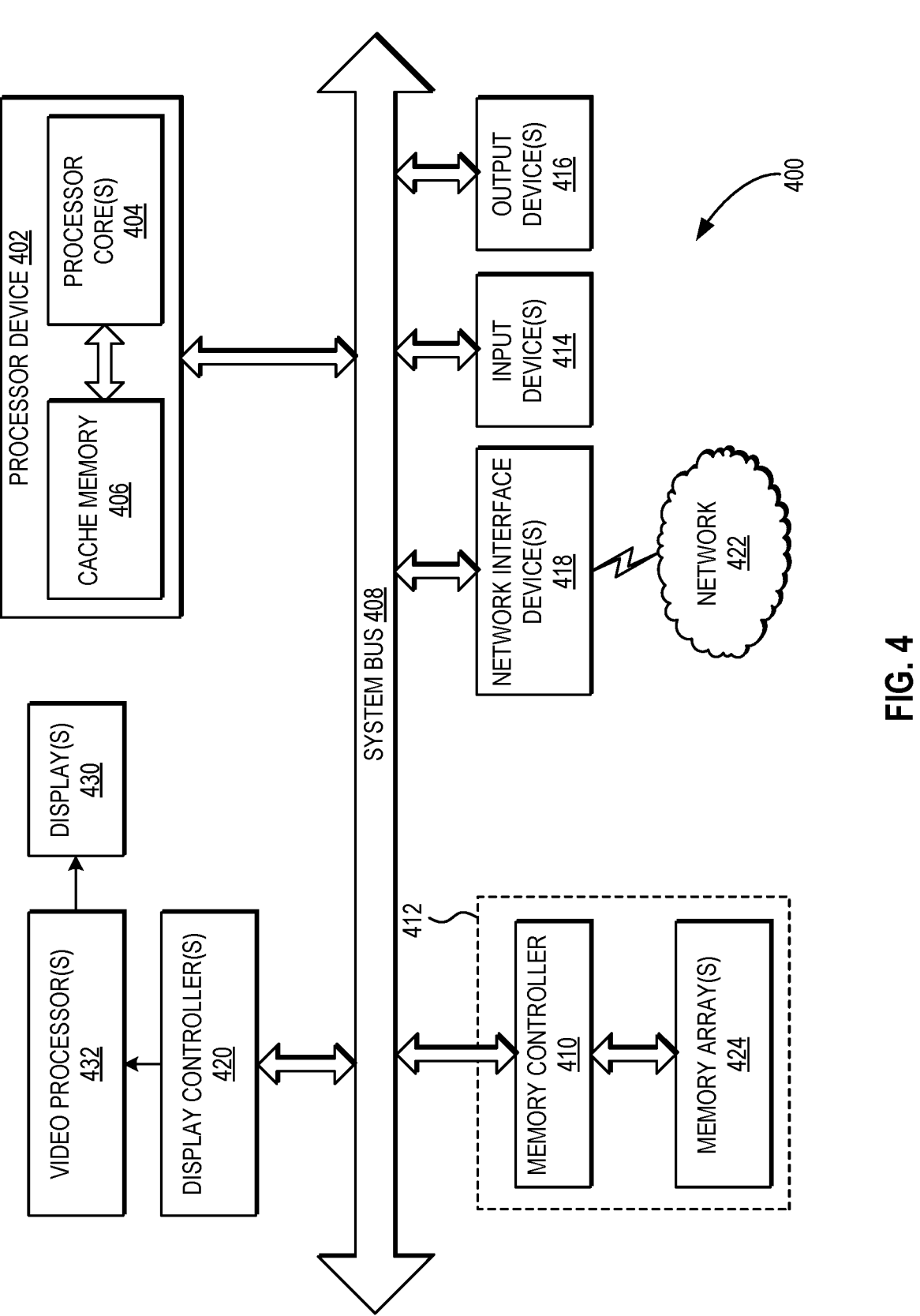
FIG. 4 is a block diagram of an exemplary processor-based device that can include the processor device of FIG. 1.

In this regard, FIG. 4 illustrates an example of a processor-based device 400 as illustrated and described with respect to FIG. 1. In this example, the processor-based device 400 includes a processor device 402, which corresponds in functionality to the processor device 100 of FIG. 1 and comprises one or more processor cores 404 coupled to a cache memory 406. The processor core(s) 404 is also coupled to a system bus 408 and can intercouple devices included in the processor-based device 400. As is well known, the processor core(s) 404 communicates with these other devices by exchanging address, control, and data information over the system bus 408. For example, the processor core(s) 404 can communicate bus transaction requests to a memory controller 410. Although not illustrated in FIG. 4, multiple system buses 408 could be provided, wherein each system bus 408 constitutes a different fabric.

Other devices may be connected to the system bus 408. As illustrated in FIG. 4, these devices can include a memory system 412, one or more input devices 414, one or more output devices 416, one or more network interface devices 418, and one or more display controllers 420, as examples. The input device(s) 414 can include any type of input device, including, but not limited to, input keys, switches, voice processors, etc. The output device(s) 416 can include any type of output device, including, but not limited to, audio, video, other visual indicators, etc. The network interface device(s) 418 can be any devices configured to allow exchange of data to and from a network 422. The network 422 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 418 can be configured to support any type of communications protocol desired. The memory system 412 can include the memory controller 410 coupled to one or more memory arrays 424. The display controller(s) may comprise, e.g., the GPU 106 of FIG. 1.

The processor core(s) 404 may also be configured to access the display controller(s) 420 over the system bus 408 to control information sent to one or more displays 430. The display controller(s) 420 sends information to the display(s) 430 to be displayed via one or more video processors 432, which process the information to be displayed into a format suitable for the display(s) 430. The display(s) 430 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor device, comprising:
   a core cluster comprising:
      a plurality of processor cores; and
      a cluster thermal management circuit;
   the cluster thermal management circuit configured to:
      receive one or more power consumption measurements for a corresponding one or more functional units of a processor core of the plurality of processor cores;
      receive one or more temperature measurements by a corresponding one or more thermal sensors external to a point of interest (POI) within the processor core;
      generate a predicted temperature at the POI based on a temperature evolution model that correlates the one or more power consumption measurements and the one or more temperature measurements with the predicted temperature at the POI;
      determine whether the predicted temperature at the POI exceeds a thermal mitigation threshold; and
      responsive to determining that the predicted temperature at the POI exceeds the thermal mitigation threshold, perform a thermal management operation.

2. The processor device of clause 1, wherein the temperature evolution model comprises:
   a transfer function model comprising:
      a plurality of inputs each representing a pre-silicon power consumption measurement of a functional unit of the one or more functional units; and
      a plurality of outputs each representing a pre-silicon temperature measurement by a thermal sensor of the one or more thermal sensor;
      wherein the transfer function model is configured to model temperature evolution at each thermal sensor as a function of power consumed by each functional unit; and
   a gradient model configured to model a change in temperature between each thermal sensor and the POI.

3. The processor device of any one of clauses 1-2, wherein the cluster thermal management circuit comprises firmware into which the temperature evolution model is integrated.

4. The processor device of any one of clauses 1-3, wherein the cluster thermal management circuit is configured to generate the predicted temperature at the POI by being configured to:
   generate, using the temperature evolution model, a first model representing a temperature at a thermal sensor of the one or more thermal sensor;
   generate, using the temperature evolution model and the first model, a second model representing a temperature at the POI; and
   generate, using the temperature evolution model, a third model representing a boundary condition.

5. The processor device of any one of clauses 1-4, wherein:
   the core cluster further comprises a clock throttling circuit; and
   the cluster thermal management circuit is configured to perform the thermal management operation by being configured to:
      calculate a power threshold for the processor core using the temperature evolution model, wherein the power threshold represents a maximum power that can be consumed by the processor core without exceeding the thermal mitigation threshold;
      determine whether a current power consumption of the processor core exceeds the power threshold; and
      responsive to determining that the current power consumption of the processor core exceeds the power threshold:
         identify a target clock throttling level that is lower than a current clock throttling level of the core cluster; and
         transmit the target clock throttling level to the clock throttling circuit.

6. The processor device of any one of clauses 1-5, wherein:
   the core cluster further comprises a dynamic voltage and frequency scaling (DVFS) circuit; and
   the cluster thermal management circuit is configured to:
      calculate one or more operating points for the core cluster using the temperature evolution model; and
      perform the thermal management operation by being configured to:
         select a target operating point from among the one or more operating points, wherein the target operating point is lower than a current operating point for the core cluster; and
         transmit the target operating point to the DVFS circuit.

7. The processor device of clause 6, wherein:
   the cluster thermal management circuit is configured to calculate the one or more operating points for the core cluster by being configured to:
   calculate a cost function; and
   generate a frequency change policy using the cost function; and
   the cluster thermal management circuit is configured to select the target operating point from among the one or more operating points based on the frequency change policy.

8. The processor device of clause 7, wherein the cluster thermal management circuit is configured to calculate the cost function by being configured to predict future temperature evolution based on a future temperature evolution filter.

9. The processor device of any one of clauses 1-8, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. A processor device, comprising:
means for receiving one or more power consumption measurements for a corresponding one or more functional units of a processor core of a plurality of processor cores of a core cluster of the processor device;
means for receiving one or more temperature measurements by a corresponding one or more thermal sensors external to a point of interest (POI) within the processor core;
means for generating a predicted temperature at the POI based on a temperature evolution model that correlates the one or more power consumption measurements and the one or more temperature measurements with the predicted temperature at the POI;
means for determining whether the predicted temperature at the POI exceeds a thermal mitigation threshold; and
means for performing a thermal management operation, responsive to determining that the predicted temperature at the POI exceeds the thermal mitigation threshold.

11. A method for performing thermal management based on temperature evolution models in processor devices, comprising:
determining, by a cluster thermal management circuit of a core cluster of a processor device, one or more power consumption measurements for a corresponding one or more functional units of a processor core of a plurality of processor cores of the core cluster;
determining, by the cluster thermal management circuit, one or more temperature measurements by a corresponding one or more thermal sensor external to a point of interest (POI) within the processor core;
generating, by the cluster thermal management circuit, a predicted temperature at the POI based on a temperature evolution model that correlates the one or more power consumption measurements and the one or more temperature measurements with the predicted temperature at the POI;
determining, by the cluster thermal management circuit, that the predicted temperature at the POI exceeds a thermal mitigation threshold; and
responsive to determining that the predicted temperature at the POI exceeds the thermal mitigation threshold, performing, by the cluster thermal management circuit, a thermal management operation.

12. The method of clause 11, wherein the temperature evolution model comprises:
a transfer function model comprising:

a plurality of inputs each representing a pre-silicon power consumption measurement of a functional unit of the one or more functional units; and
a plurality of outputs each representing a pre-silicon temperature measurement by a thermal sensor of the one or more thermal sensor;
wherein the transfer function model is configured to model temperature evolution at each thermal sensor as a function of power consumed by each functional unit; and
a gradient model configured to model a change in temperature between each thermal sensor and the POI.

13. The method of any one of clauses 11-12, wherein the cluster thermal management circuit comprises firmware into which the temperature evolution model is integrated.

14. The method of any one of clauses 11-13, wherein generating the predicted temperature at the POI comprises:
generating, using the temperature evolution model, a first model representing a temperature at a thermal sensor of the one or more thermal sensor;
generating, using the temperature evolution model and the first model, a second model representing a temperature at the POI; and
generating, using the temperature evolution model, a third model representing a boundary condition.

15. The method of any one of clauses 11-14, wherein:
the core cluster comprises a clock throttling circuit; and
performing the thermal management operation comprises:
calculating a power threshold for the processor core using the temperature evolution model, wherein the power threshold represents a maximum power that can be consumed by the processor core without exceeding the thermal mitigation threshold;
determining that a current power consumption of the processor core exceeds the power threshold; and
responsive to determining that the current power consumption of the processor core exceeds the power threshold:
identifying a target clock throttling level that is lower than a current clock throttling level of the core cluster; and
transmitting the target clock throttling level to the clock throttling circuit.

16. The method of any one of clauses 11-15, wherein:
the core cluster comprises a dynamic voltage and frequency scaling (DVFS) circuit;
the method further comprises calculating one or more operating points for the core cluster using the temperature evolution model; and
performing the thermal management operation comprises:
selecting a target operating point from among the one or more operating points, wherein the target operating point is lower than a current operating point for the core cluster; and
transmitting the target operating point to the DVFS circuit.

17. The method of clause 16, wherein:
calculating the one or more operating points for the core cluster comprises: calculating a cost function; and
generating a frequency change policy using the cost function; and selecting the target operating point from among the one or more operating points is based on the frequency change policy.

18. The method of clause 17, wherein calculating the cost function comprises predicting future temperature evolution based on a future temperature evolution filter.

19. A non-transitory computer-readable medium, having stored thereon computer-executable instructions that, when executed, cause a processor device of a processor-based device to:

receive one or more power consumption measurements for a corresponding one or more functional units of a processor core of a plurality of processor cores of a core cluster of the processor device;

receive one or more temperature measurements by a corresponding one or more thermal sensors external to a point of interest (POI) within the processor core;

generate a predicted temperature at the POI based on a temperature evolution model that correlates the one or more power consumption measurements and the one or more temperature measurements with the predicted temperature at the POI;

determine whether the predicted temperature at the POI exceeds a thermal mitigation threshold; and responsive to determining that the predicted temperature at the POI exceeds the thermal mitigation threshold, perform a thermal management operation.

20. The non-transitory computer-readable medium of clause 19, wherein the temperature evolution model comprises:

a transfer function model comprising:

a plurality of inputs each representing a pre-silicon power consumption measurement of a functional unit of the one or more functional units; and a plurality of outputs each representing a pre-silicon temperature measurement by a thermal sensor of the one or more thermal sensor;

wherein the transfer function model is configured to model temperature evolution at each thermal sensor as a function of power consumed by each functional unit; and a gradient model configured to model a change in temperature between each thermal sensor and the POI.

21. The non-transitory computer-readable medium of any one of clauses 19-20, wherein the computer-executable instructions cause the processor device to generate the predicted temperature at the POI by causing the processor device to:

generate, using the temperature evolution model, a first model representing a temperature at a thermal sensor of the one or more thermal sensor;

generate, using the temperature evolution model and the first model, a second model representing a temperature at the POI; and generate, using the temperature evolution model, a third model representing a boundary condition.

22 The non-transitory computer-readable medium of any one of clauses 19-21, wherein:

the core cluster comprises a clock throttling circuit; and the computer-executable instructions cause the processor device to perform the thermal management operation by causing the processor device to:

calculate a power threshold for the processor core using the temperature evolution model, wherein the power threshold represents a maximum power that can be consumed by the processor core without exceeding the thermal mitigation threshold;

determine whether a current power consumption of the processor core exceeds the power threshold; and responsive to determining that the current power consumption of the processor core exceeds the power threshold:

identify a target clock throttling level that is lower than a current clock throttling level of the core cluster; and transmit the target clock throttling level to the clock throttling circuit.

23. The non-transitory computer-readable medium of any one of clauses 19-22, wherein:

the core cluster comprises a dynamic voltage and frequency scaling (DVFS) circuit;

the computer-executable instructions further cause the processor device to calculate one or more operating points for the core cluster using the temperature evolution model; and the computer-executable instructions cause the processor device to perform the thermal management operation by causing the processor device to:

select a target operating point from among the one or more operating points, wherein the target operating point is lower than a current operating point for the core cluster; and transmit the target operating point to the DVFS circuit.

24 The non-transitory computer-readable medium of clause 23, wherein:

the computer-executable instructions cause the processor device to calculate the one or more operating points for the core cluster by causing the processor device to:

calculate a cost function; and generate a frequency change policy using the cost function; and the computer-executable instructions cause the processor device to select the target operating point from among the one or more operating points based on the frequency change policy.

25. The non-transitory computer-readable medium of clause 24, wherein the computer-executable instructions cause the processor device to calculate the cost function by causing the processor device to predict future temperature evolution based on a future temperature evolution filter.

What is claimed is:

1. A processor device, comprising:

a core cluster comprising:

a plurality of processor cores; and a cluster thermal management circuit;

the cluster thermal management circuit configured to:

receive one or more power consumption measurements for a corresponding one or more functional units of a processor core of the plurality of processor cores;

receive one or more temperature measurements by a corresponding one or more thermal sensors external to a point of interest (POI) within the processor core;

generate a predicted temperature at the POI based on a temperature evolution model that correlates the one or more power consumption measurements and the one or more temperature measurements with the predicted temperature at the POI;

determine whether the predicted temperature at the POI exceeds a thermal mitigation threshold; and responsive to determining that the predicted temperature at the POI exceeds the thermal mitigation threshold, perform a thermal management operation, wherein the temperature evolution model comprises:

a transfer function model comprising:

a plurality of inputs each representing a pre-silicon power consumption measurement of a functional unit of the one or more functional units; and a plurality of outputs each representing a pre-silicon temperature measurement by a thermal sensor of the one or more thermal sensor;

wherein the transfer function model is configured to model temperature evolution at each thermal sensor as a function of power consumed by each functional unit; and a gradient model configured to model a change in temperature between each thermal sensor and the POI.

2. The processor device of claim 1, wherein the cluster thermal management circuit comprises firmware into which the temperature evolution model is integrated.

3. The processor device of claim 1, wherein the cluster thermal management circuit is configured to generate the predicted temperature at the POI by being configured to:

generate, using the temperature evolution model, a first model representing a temperature at a thermal sensor of the one or more thermal sensor;

generate, using the temperature evolution model and the first model, a second model representing a temperature at the POI; and generate, using the temperature evolution model, a third model representing a boundary condition.

4. The processor device of claim 1, wherein:

the core cluster further comprises a clock throttling circuit; and the cluster thermal management circuit is configured to perform the thermal management operation by being configured to:

calculate a power threshold for the processor core using the temperature evolution model, wherein the power threshold represents a maximum power that can be consumed by the processor core without exceeding the thermal mitigation threshold;

determine whether a current power consumption of the processor core exceeds the power threshold; and responsive to determining that the current power consumption of the processor core exceeds the power threshold:

identify a target clock throttling level that is lower than a current clock throttling level of the core cluster; and transmit the target clock throttling level to the clock throttling circuit.

5. The processor device of claim 1, wherein:

the core cluster further comprises a dynamic voltage and frequency scaling (DVFS) circuit; and the cluster thermal management circuit is configured to:

calculate one or more operating points for the core cluster using the temperature evolution model; and perform the thermal management operation by being configured to:

select a target operating point from among the one or more operating points, wherein the target operating point is lower than a current operating point for the core cluster; and transmit the target operating point to the DVFS circuit.

6. The processor device of claim 5, wherein:

the cluster thermal management circuit is configured to calculate the one or more operating points for the core cluster by being configured to:

calculate a cost function; and generate a frequency change policy using the cost function; and the cluster thermal management circuit is configured to select the target operating point from among the one or more operating points based on the frequency change policy.

7. The processor device of claim 6, wherein the cluster thermal management circuit is configured to calculate the cost function by being configured to predict future temperature evolution based on a future temperature evolution filter.

8. The processor device of claim 1, integrated into a device selected from the group consisting of: a set top box; an entertainment unit; a navigation device; a communications device;

a fixed location data unit; a mobile location data unit; a global positioning system (GPS) device; a mobile phone; a cellular phone; a smart phone; a session initiation protocol (SIP) phone; a tablet;

a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

9. A method for performing thermal management based on temperature evolution models in processor devices, comprising:

determining, by a cluster thermal management circuit of a core cluster of a processor device, one or more power consumption measurements for a corresponding one or more functional units of a processor core of a plurality of processor cores of the core cluster;

determining, by the cluster thermal management circuit, one or more temperature measurements by a corresponding one or more thermal sensor external to a point of interest (POI) within the processor core;

generating, by the cluster thermal management circuit, a predicted temperature at the POI based on a temperature evolution model that correlates the one or more power consumption measurements and the one or more temperature measurements with the predicted temperature at the POI;

determining, by the cluster thermal management circuit, that the predicted temperature at the POI exceeds a thermal mitigation threshold; and responsive to determining that the predicted temperature at the POI exceeds the thermal mitigation threshold, performing, by the cluster thermal management circuit, a thermal management operation, wherein the temperature evolution model comprises:

a transfer function model comprising:

a plurality of inputs each representing a pre-silicon power consumption measurement of a functional unit of the one or more functional units; and a plurality of outputs each representing a pre-silicon temperature measurement by a thermal sensor of the one or more thermal sensor;

wherein the transfer function model is configured to model temperature evolution at each thermal sensor as a function of power consumed by each functional unit; and a gradient model configured to model a change in temperature between each thermal sensor and the POI.

10. The method of claim 9, wherein the cluster thermal management circuit comprises firmware into which the temperature evolution model is integrated.

11. The method of claim 9, wherein generating the predicted temperature at the POI comprises:

generating, using the temperature evolution model, a first model representing a temperature at a thermal sensor of the one or more thermal sensor;

generating, using the temperature evolution model and the first model, a second model representing a temperature at the POI; and generating, using the temperature evolution model, a third model representing a boundary condition.

12. The method of claim 9, wherein:

the core cluster comprises a clock throttling circuit; and performing the thermal management operation comprises:

calculating a power threshold for the processor core using the temperature evolution model, wherein the power threshold represents a maximum power that can be consumed by the processor core without exceeding the thermal mitigation threshold;

determining that a current power consumption of the processor core exceeds the power threshold; and responsive to determining that the current power consumption of the processor core exceeds the power threshold:

identifying a target clock throttling level that is lower than a current clock throttling level of the core cluster; and transmitting the target clock throttling level to the clock throttling circuit.

13. The method of claim 9, wherein:

the core cluster comprises a dynamic voltage and frequency scaling (DVFS) circuit;

the method further comprises calculating one or more operating points for the core cluster using the temperature evolution model; and performing the thermal management operation comprises:

selecting a target operating point from among the one or more operating points, wherein the target operating point is lower than a current operating point for the core cluster; and transmitting the target operating point to the DVFS circuit.

14. The method of claim 13, wherein:

calculating the one or more operating points for the core cluster comprises:

calculating a cost function; and generating a frequency change policy using the cost function; and selecting the target operating point from among the one or more operating points is based on the frequency change policy.

15. The method of claim 14, wherein calculating the cost function comprises predicting future temperature evolution based on a future temperature evolution filter.

16. A non-transitory computer-readable medium, having stored thereon computer-executable instructions that, when executed, cause a processor device of a processor-based device to:

receive one or more power consumption measurements for a corresponding one or more functional units of a processor core of a plurality of processor cores of a core cluster of the processor device;

receive one or more temperature measurements by a corresponding one or more thermal sensors external to a point of interest (POI) within the processor core;

generate a predicted temperature at the POI based on a temperature evolution model that correlates the one or more power consumption measurements and the one or more temperature measurements with the predicted temperature at the POI;

determine whether the predicted temperature at the POI exceeds a thermal mitigation threshold; and responsive to determining that the predicted temperature at the POI exceeds the thermal mitigation threshold, perform a thermal management operation, wherein the temperature evolution model comprises:

a transfer function model comprising:

a plurality of inputs each representing a pre-silicon power consumption measurement of a functional unit of the one or more functional units; and a plurality of outputs each representing a pre-silicon temperature measurement by a thermal sensor of the one or more thermal sensor;

wherein the transfer function model is configured to model temperature evolution at each thermal sensor as a function of power consumed by each functional unit; and a gradient model configured to model a change in temperature between each thermal sensor and the POI.

17. The non-transitory computer-readable medium of claim 16, wherein the computer-executable instructions cause the processor device to generate the predicted temperature at the POI by causing the processor device to:

generate, using the temperature evolution model, a first model representing a temperature at a thermal sensor of the one or more thermal sensor;

generate, using the temperature evolution model and the first model, a second model representing a temperature at the POI; and generate, using the temperature evolution model, a third model representing a boundary condition.

18. The non-transitory computer-readable medium of claim 16, wherein:

the core cluster comprises a clock throttling circuit; and the computer-executable instructions cause the processor device to perform the thermal management operation by causing the processor device to:

calculate a power threshold for the processor core using the temperature evolution model, wherein the power threshold represents a maximum power that can be consumed by the processor core without exceeding the thermal mitigation threshold;

determine whether a current power consumption of the processor core exceeds the power threshold; and responsive to determining that the current power consumption of the processor core exceeds the power threshold:

identify a target clock throttling level that is lower than a current clock throttling level of the core cluster; and transmit the target clock throttling level to the clock throttling circuit.

19. The non-transitory computer-readable medium of claim 16, wherein:

the core cluster comprises a dynamic voltage and frequency scaling (DVFS) circuit;

the computer-executable instructions further cause the processor device to calculate one or more operating points for the core cluster using the temperature evolution model; and the computer-executable instructions cause the processor device to perform the thermal management operation by causing the processor device to:

select a target operating point from among the one or more operating points, wherein the target operating point is lower than a current operating point for the core cluster; and transmit the target operating point to the DVFS circuit.

20. The non-transitory computer-readable medium of claim 19, wherein:

the computer-executable instructions cause the processor device to calculate the one or more operating points for the core cluster by causing the processor device to:

calculate a cost function; and generate a frequency change policy using the cost function; and the computer-executable instructions cause the processor device to select the target operating point from among the one or more operating points based on the frequency change policy.

21. The non-transitory computer-readable medium of claim 20, wherein the computer-executable instructions cause the processor device to calculate the cost function by causing the processor device to predict future temperature evolution based on a future temperature evolution filter.

* * * * *